United States Patent
Tomura et al.

(10) Patent No.: US 11,757,291 B2
(45) Date of Patent: *Sep. 12, 2023

(54) POWER SUPPLY DEVICE

(71) Applicant: TOYOTA JIDOSHA KABUSHIKI KAISHA, Toyota (JP)

(72) Inventors: Shuji Tomura, Nagakute (JP); Naoki Yanagizawa, Nagakute (JP); Kazuo Ootsuka, Nagakute (JP); Kyosuke Tanemura, Nagakute (JP); Shigeaki Goto, Nagakute (JP); Junta Izumi, Nagoya (JP); Kenji Kimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

This patent is subject to a terminal disclaimer.

(21) Appl. No.: 16/654,998

(22) Filed: Oct. 16, 2019

(65) Prior Publication Data

US 2020/0136412 A1    Apr. 30, 2020

(30) Foreign Application Priority Data

Oct. 31, 2018 (JP) ................................ 2018-204646

(51) Int. Cl.
    *H02J 7/00* (2006.01)
(52) U.S. Cl.
    CPC .......... *H02J 7/0013* (2013.01); *H02J 7/0063* (2013.01); *H02J 7/007182* (2020.01); *H02J 7/0048* (2020.01)

(58) Field of Classification Search
    CPC .................................................... H02J 7/0016
    See application file for complete search history.

(56) References Cited

U.S. PATENT DOCUMENTS

| 5,389,843 | A  | * | 2/1995 | McKinney | ............. | H03K 5/131 |
| | | | | | | 327/261 |
| 6,240,082 | B1 | * | 5/2001 | Kim | ....................... | H04B 1/707 |
| | | | | | | 370/342 |

(Continued)

FOREIGN PATENT DOCUMENTS

| CN | 106847156 A | 6/2017 |
| JP | 2008-282236 A | 11/2008 |

(Continued)

OTHER PUBLICATIONS

Kazuo Ootsuka et al., Office Action issued in U.S. Appl. No. 16/656,772 dated Nov. 26, 2021.

(Continued)

*Primary Examiner* — Drew A Dunn
*Assistant Examiner* — Tynese V McDaniel
(74) *Attorney, Agent, or Firm* — Dickinson Wright, PLLC

(57) ABSTRACT

A power supply device includes a plurality of battery modules, the battery modules are connected to one another in series according to a gate driving signal from a controller, the power supply device delays the gate driving signal in a gate driving signal processing circuit included in each of the battery modules, and thereafter, transmits the gate driving signal from an upstream to a downstream of the series connection, and the power supply device controls the battery modules by superimposing a control signal for the battery module on the gate driving signal.

1 Claim, 6 Drawing Sheets

(56) References Cited

U.S. PATENT DOCUMENTS

| | | | | |
|---|---|---|---|---|
| 9,322,883 | B2* | 4/2016 | Danner | G01R 31/3835 |
| 9,647,463 | B2* | 5/2017 | Brandl | H02J 7/0014 |
| 9,866,054 | B2* | 1/2018 | Lee | H02J 7/0026 |
| 2004/0198468 | A1* | 10/2004 | Patel | H02J 7/0025 455/574 |
| 2005/0083016 | A1* | 4/2005 | Yau | H02J 7/0018 320/116 |
| 2007/0001651 | A1* | 1/2007 | Harvey | H02J 7/0016 320/166 |
| 2009/0085520 | A1 | 4/2009 | Murao | |
| 2010/0141209 | A1* | 6/2010 | Shiu | H02J 7/0016 320/120 |
| 2011/0025270 | A1* | 2/2011 | Nakanishi | H01M 10/441 320/116 |
| 2011/0057617 | A1* | 3/2011 | Finberg | H02J 7/0021 320/122 |
| 2011/0080138 | A1* | 4/2011 | Nakanishi | H02J 7/0016 320/116 |
| 2013/0002016 | A1* | 1/2013 | Furukawa | H01M 10/425 307/9.1 |
| 2013/0026993 | A1* | 1/2013 | Hintz | H02J 7/0016 320/119 |
| 2013/0108898 | A1* | 5/2013 | Potts | H01M 10/4207 429/50 |
| 2013/0249317 | A1* | 9/2013 | Kang | B60L 58/18 307/116 |
| 2014/0021923 | A1 | 1/2014 | Uchida | |
| 2014/0176104 | A1* | 6/2014 | Lin | H02M 3/156 323/284 |
| 2015/0104673 | A1* | 4/2015 | de Greef | B60L 3/12 429/7 |
| 2015/0115736 | A1* | 4/2015 | Snyder | H02J 7/0021 307/115 |
| 2016/0233709 | A1* | 8/2016 | Lee | H02J 7/007 |
| 2016/0254667 | A1* | 9/2016 | Lee | H02J 13/00032 307/39 |
| 2016/0276854 | A1 | 9/2016 | Lian | |
| 2017/0040646 | A1* | 2/2017 | Beaston | H02J 7/0026 |
| 2017/0077558 | A1* | 3/2017 | Nystrom | H02J 7/0016 |
| 2017/0126032 | A1* | 5/2017 | Beaston | H02J 13/0006 |
| 2017/0163250 | A1* | 6/2017 | Tokuhiro | H03K 5/133 |
| 2017/0163268 | A1* | 6/2017 | Maeda | H03K 5/14 |
| 2017/0288431 | A1* | 10/2017 | Lian | B60L 58/10 |
| 2018/0313902 | A1* | 11/2018 | Nagasue | H02J 13/0003 |
| 2019/0057828 | A1* | 2/2019 | Gurtner | B60L 58/19 |
| 2019/0181661 | A1* | 6/2019 | Shen | H02J 7/0029 |
| 2019/0190282 | A1 | 6/2019 | Zheng et al. | |
| 2019/0267896 | A1* | 8/2019 | Goto | H01M 10/425 |
| 2019/0288520 | A1 | 9/2019 | Abdel-Monem et al. | |
| 2019/0361075 | A1* | 11/2019 | Lee | H01M 10/482 |
| 2019/0363311 | A1* | 11/2019 | Crowley | H02J 7/0048 |
| 2020/0076206 | A1* | 3/2020 | Goto | H02J 7/02 |
| 2020/0112183 | A1* | 4/2020 | Tomura | G01R 31/392 |
| 2020/0128745 | A1 | 4/2020 | Bueermann | |
| 2020/0132780 | A1* | 4/2020 | Ootsuka | H02J 7/0013 |
| 2020/0136196 | A1* | 4/2020 | Tanemura | H01M 10/425 |
| 2020/0136199 | A1* | 4/2020 | Yanagizawa | H03K 17/284 |
| 2020/0136405 | A1* | 4/2020 | Goto | H02J 7/0031 |
| 2020/0136412 | A1* | 4/2020 | Tomura | H02J 7/007182 |
| 2020/0166576 | A1* | 5/2020 | Yasoshima | H01M 10/4207 |
| 2020/0169080 | A1* | 5/2020 | Yasoshima | H02M 3/158 |
| 2020/0169081 | A1* | 5/2020 | Yasoshima | H02M 3/158 |
| 2020/0169082 | A1* | 5/2020 | Yasoshima | H02J 7/0013 |
| 2020/0169115 | A1* | 5/2020 | Yasoshima | H02J 1/08 |
| 2020/0176982 | A1* | 6/2020 | Yasoshima | H02J 1/102 |
| 2020/0176983 | A1* | 6/2020 | Yasoshima | H02M 3/158 |
| 2020/0177018 | A1* | 6/2020 | Yasoshima | H02J 9/061 |
| 2020/0177019 | A1* | 6/2020 | Yasoshima | H02J 7/0024 |
| 2020/0177178 | A1* | 6/2020 | Yasoshima | H02J 7/007 |
| 2020/0303785 | A1* | 9/2020 | Chang | H01M 10/4207 |
| 2021/0050734 | A1* | 2/2021 | Huot-Marchand | H04L 25/0284 |
| 2021/0075227 | A1* | 3/2021 | Chang | H02J 7/00036 |
| 2021/0184474 | A1* | 6/2021 | Kobayashi | H01M 10/052 |
| 2021/0203178 | A1* | 7/2021 | Tsukada | H02J 7/0025 |

FOREIGN PATENT DOCUMENTS

| | | |
|---|---|---|
| JP | 2011114906 A | 6/2011 |
| JP | 2012050272 A | 3/2012 |
| JP | 2012244794 A | 12/2012 |
| JP | 2013135477 A | 7/2013 |
| JP | 2013-179739 A | 9/2013 |
| JP | 2014143771 A | 8/2014 |
| JP | 2018-074709 A | 5/2018 |
| KR | 101241532 B1 | 3/2013 |
| WO | 2013035963 A1 | 3/2013 |
| WO | 2018041141 A1 | 3/2018 |
| WO | 2018/079664 A1 | 5/2018 |
| WO | 2018179774 A1 | 10/2018 |

OTHER PUBLICATIONS

Naoki Yanagizawa et al., U.S. Appl. No. 16/656,736, filed Oct. 18, 2019.

Naoki Yanagizawa et al., Office Action issued to U.S. Appl. No. 16/656,736 dated Jun. 7, 2021.

Kazuo Ootsuka et al., U.S. Appl. No. 16/656,772, filed Oct. 18, 2019.

European Search Report issued to EP Patent Application No. 19204314.9 dated Dec. 4, 2019.

U.S. Appl. No. 16/656,736, Notice of Allowance dated Feb. 3, 2022.

U.S. Appl. No. 16/656,736, Notice of Allowance dated Oct. 20, 2021.

Notice Of Allowance Issued To U.S. Appl. No. 16/656,772 dated Jan. 19, 2023.

Kazuo Ootsuka et al., Corrected Notice Of Allowability Issued To U.S. Appl. No. 16/656,772 dated Mar. 24, 2023.

Office Action Issued To U.S. Appl. No. 16/656,772 dated Oct. 6, 2022.

* cited by examiner

POWER SUPPLY DEVICE

INCORPORATION BY REFERENCE

The disclosure of Japanese Patent Application No. 2018-204646 filed on Oct. 31, 2018 including the specification, drawings and abstract is incorporated herein by reference in its entirety.

BACKGROUND

1. Technical Field

The present disclosure relates to a power supply device that has battery modules connected in series and supplies electric power.

2. Description of Related Art

Power supply devices that have a plurality of battery modules connected in series and supply loads with electric power (power loads) are used. When the batteries included in the battery modules are secondary batteries, the power supply devices can also charge (regenerate electric power for) these batteries from the load side.

In such a power supply device, provided is a configuration including a switching circuit that connects and isolates the battery module to and from a load based on a gate driving signal. In this circuit configuration, voltage control is performed by driving the switching circuit of each battery module with a gate driving signal via a delay circuit. Proposed is a technique to reduce imbalance in state-of-charge (SOC) among the battery modules by providing each battery module with a balancing circuit (Japanese Patent Application Publication No. 2013-179739). Also, disclosed is a configuration in which a gate driving signal line is shared and a failure signal of the gate driving circuit is transmitted (Japanese Patent Application Publication No. 2008-282236).

SUMMARY

However, in the conventional power supply device, it is necessary to separately provide a unit for communicating a control signal when performing a control using the control signal other than the gate driving signal. In the technique described in JP 2008-282236 A, there is disclosed only a configuration in which a failure signal is transmitted in a period in which the switch is turned off and no gate driving signal is transmitted, but there is no mention about a configuration in which a failure signal is transmitted during the driving operation using a gate driving signal.

One aspect of the present disclosure is a power supply device that includes a plurality of battery modules having secondary batteries, the battery modules being connected to one another in series according to a gate driving signal from a controller, the power supply device delaying the gate driving signal in a gate driving signal processing circuit included in each of the battery modules, and thereafter, transmitting the gate driving signal from an upstream to a downstream of the series connection, the power supply device controlling the battery modules by superimposing a control signal for the battery module on the gate driving signal.

Here, it is suitable that the gate driving signal processing circuit removes the control signal from the gate driving signal on which the control signal is superimposed so as to generate a waveform-shaped gate driving signal with a shaped waveform, and controls the battery module concerned by using the control signal and the waveform-shaped gate driving signal, and transmits the gate driving signal on which the control signal is superimposed to the battery module located downstream.

In addition, it is suitable that the battery module includes a disconnecting unit that forcibly disconnects the other battery module from the series connection regardless of the gate driving signal, and the control signal is a signal for forcibly disconnecting the battery module from the series connection by the disconnecting unit.

Furthermore, it is suitable that the battery module includes a connecting unit that forcibly connects the other battery module to the series connection regardless of the gate driving signal, and the control signal is a signal for forcibly connecting the battery module to the series connection by the connecting unit.

Another aspect of the present disclosure is a power supply device that includes a plurality of battery modules having secondary batteries, the battery modules being connected to one another in series according to a gate driving signal from a controller, the power supply device delaying the gate driving signal in a gate driving signal processing circuit included in each of the battery modules, and thereafter, transmitting the gate driving signal from an upstream to a downstream of the series connection, and returning the gate driving signal from the battery modules located on a downstream to the controller, the power supply device transmitting a state of the battery module to the controller by superimposing a state signal indicating the state of the battery module on the gate driving signal.

Here, it is suitable that the gate driving signal processing circuit removes the state signal from the gate driving signal on which the state signal is superimposed so as to generate a waveform-shaped gate driving signal with a shaped waveform, controls the battery module concerned by using the waveform-shaped gate driving signal, and transmits the gate driving signal on which the state signal is superimposed to the battery module located downstream.

In addition, it is suitable that the state signal includes information regarding at least one of a voltage, a temperature, and SOC of the battery module.

According to the present disclosure, it is possible to control and check the state of the power supply device using the gate driving signal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
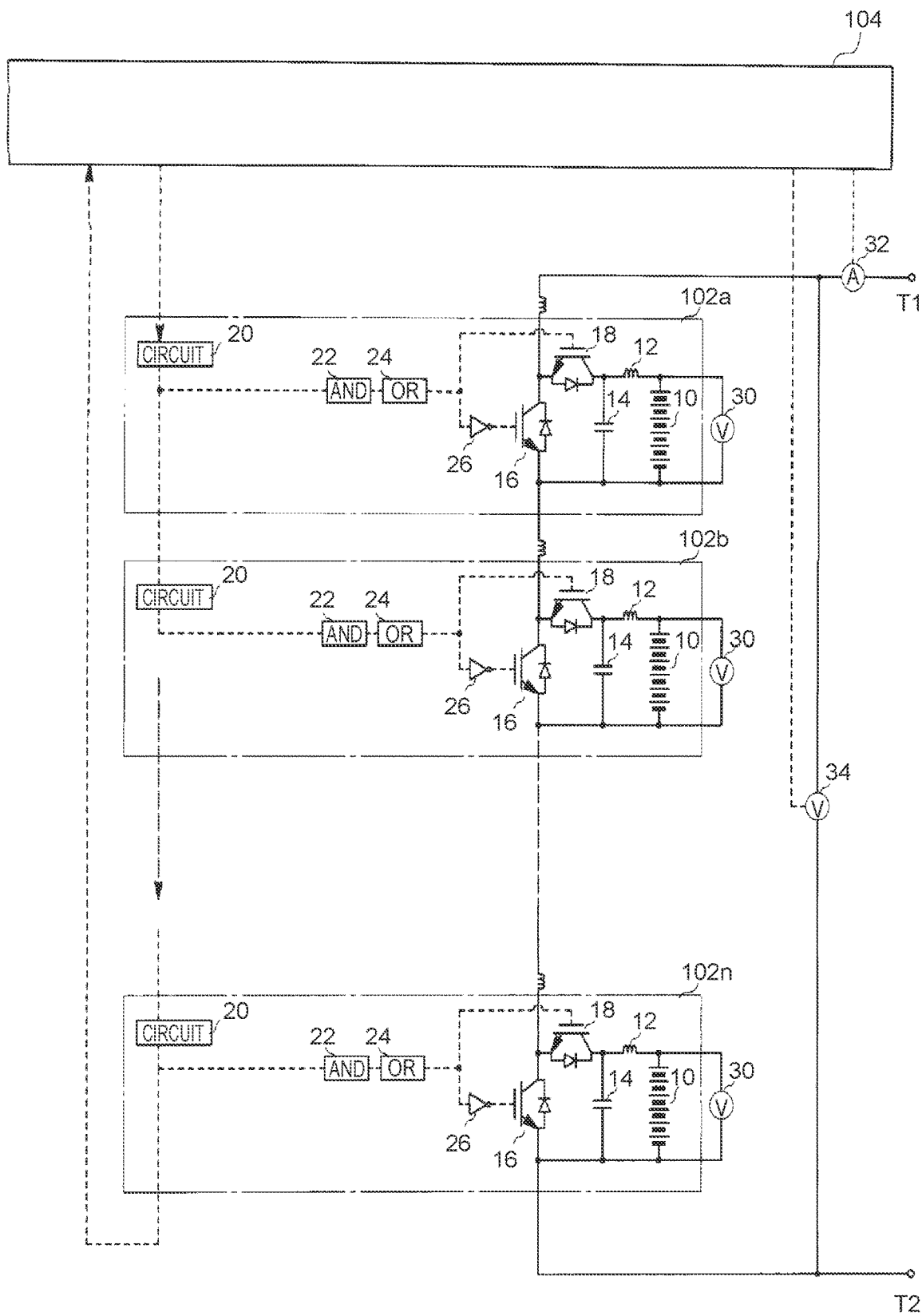
FIG. 1 is a diagram showing a configuration of a power supply device according to an embodiment of the present disclosure.

As shown in FIG. 1, a power supply device 100 in the present embodiment is configured to include battery modules 102 and a controller 104. The power supply device 100 is configured to include a plurality of battery modules 102 (102a, 102b, ... 102n). The plurality of battery modules 102 can be connected in series with one another under control by the controller 104. The plurality of battery modules 102 included in the power supply device 100 can supply a load (not shown) connected to terminals T1, T2 with electric power (power the load), or can be charged with (regenerate) electric power from a power source (not shown) connected to the terminals T1, T2.

Each battery module 102 includes a battery 10, a choke coil 12, a capacitor 14, a first switch element 16, a second switch element 18, a gate driving signal processing circuit 20, an AND element 22, an OR element 24, and an NOT element 26. In the present embodiment, the battery modules 102 each have the same configuration.

The battery 10 includes at least one secondary battery. For example, the battery 10 may be configured to connect a plurality of lithium-ion batteries, nickel-metal hydride batteries, or the like in series or parallel. The choke coil 12 and the capacitor 14 are included in a smoothing circuit (low-pass filter circuit) that smooths an output from the battery 10 and outputs the smoothed output. That is, since a secondary battery is used as the battery 10, in order to reduce deterioration of the battery 10 due to increase in internal resistance loss, the current is smoothed by an RLC filter formed by the battery 10, the choke coil 12, and the capacitor 14. Note that the choke coil 12 and the capacitor 14 are not essential components and may be omitted.

The first switch element 16 includes a switching element for short-circuiting an output terminal of the battery 10. In the present embodiment, the first switch element 16 has a configuration in which a freewheeling diode is connected in parallel to a field-effect transistor that is a switching element. The second switch element 18 is connected in series with the battery 10 between the battery 10 and the first switch element 16. In the present embodiment, the second switch element 18 has a configuration in which a freewheeling diode is connected in parallel to a field-effect transistor that is a switching element. Switching of the first switch element 16 and the second switch element 18 is controlled through a gate driving signal from the controller 104. Field-effect transistors are used in the first switch element 16 and the second switch element 18 in the embodiment, but other switching elements may also be used.

The gate driving signal processing circuit 20 is a circuit that controls the battery module 102 based on the gate driving signal (on which a control signal and a state signal may be superimposed, as will be described later,) input from the controller 104 into the battery module 102. The gate driving signal processing circuit 20 includes a delay circuit that delays the gate driving signal by a predetermined time. In the power supply device 100, the gate driving signal processing circuits 20 are respectively provided in the battery modules 102 (102a, 102b, ... 102n) and connected in series with one another. Therefore, the gate driving signal input from the controller 104 is sequentially input into the battery modules 102 (102a, 102b, ... 102n) while being delayed by a predetermined time at each battery module 102. Controlling based on the gate driving signal will be described later.

The AND element 22 configures a disconnecting unit that forcibly isolates the battery module 102a from the series connection state according to a forced disconnection signal from the controller 104. The OR element 24 configures a connecting unit that forcibly connects the battery module 102a to the series connection according to a forced connection signal from the controller 104. The AND element 22 and the OR element 24 are controlled by the gate driving signal processing circuit 20. A control signal from the gate driving signal processing circuit 20 is input into one input terminal of the AND element 22, and the gate driving signal from the gate driving signal processing circuit 20 is input into the other input terminal of the AND element 22. A control signal from the gate driving signal processing circuit 20 is input into one input terminal of the OR element 24, and the gate driving signal from the gate driving signal processing circuit 20 is input into the other input terminal of the OR element 24. Output signals from the AND element 22 and the OR element 24 are input into a gate terminal of the second switch element 18. Output signals from the AND element 22 and the OR element 24 are also input into a gate terminal of the first switch element 16 through the NOT element 26.

During the normal control, a high (H)-level control signal is input from the gate driving signal processing circuit 20 into the AND element 22, and a low (L)-level control signal is input from the gate driving signal processing circuit 20 into the OR element 24. Therefore, the gate driving signal is input as is into the gate terminal of the second switch element 18, while an inverted signal of the gate driving signal is input into the gate terminal of the first switch element 16. Thus, when the gate driving signal level is high (H), the first switch element 16 is turned off and the second switch element 18 is turned on, and when the gate driving signal level is low (L), the first switch element 16 is turned on and the second switch element 18 is turned off. In other words, when the gate driving signal level is high (H), the battery module 102 is put in a state of being connected in series with the other battery modules 102, and when the gate driving signal level is low (L), the battery module 102 is put in a pass-through state of being isolated from the other battery modules 102.

During the forced disconnection, the gate driving signal processing circuit 20 of the battery module 102 to be forcibly isolated outputs a low (L)-level control signal to the AND element 22. The gate driving signal processing circuit 20 outputs a low (L)-level control signal to the OR element 24 of the battery module 102 concerned. As a result, a low (L) level is output from the AND element 22, and through the OR element 24, a high (H) level is input into the gate terminal of the first switch element 16 by the NOT element 26 and a low (L) level is input into the gate terminal of the second switch element 18. Thus, the first switch element 16 is put in a normally on state and the second switch element 18 is put in a normally off state, which puts the battery module 102 concerned in a state of being forcibly isolated regardless of the state of the gate driving signal (pass-through state). Such a forced disconnection control can be used as control for reducing imbalance in the SOC among the battery modules 102 in the power supply device 100 or to isolate any failed battery modules.

During the forced connection, the gate driving signal processing circuit 20 outputs a high (H)-level control signal to the OR element 24 of the battery module 102 to be forcibly connected. As a result, a high (H) level is output from the OR element 24, and a low (L) level is input into the gate terminal of the first switch element 16 by the NOT element 26, while a high (H) level is input into the gate terminal of the second switch element 18. Thus, the first switch element 16 is put in a normally off state and the second switch element 18 is put in a normally on state, which puts the battery module 102 concerned in a state of being forcibly connected to the series connection regardless of the state of the gate driving signal. Such a forced connection control can be used as control for reducing imbalance in the SOC among the battery modules 102 in the power supply device 100.

Note that the gate driving signal processing circuit 20 of the battery module 102 put in the forced disconnection state or the forced connection state transmits the received gate driving signal to a subsequent battery module 102 with no delay.

Normal Control

Control of the power supply device 100 will be described below with reference to FIG. 2. During the normal control, a high (H)-level forced disconnection signal is input from the gate driving signal processing circuit 20 into the AND element 22 of each of the battery modules 102 (102a, 102b, . . . 102n). A low (L)-level forced connection signal is input from the gate driving signal processing circuit 20 into the OR element 24 of each of the battery modules 102 (102a, 102b, . . . 102n). As a result, a gate driving signal from the gate driving signal processing circuit 20 is input as an inverted signal into the gate terminal of the first switch element 16 through the NOT elements 26, while a gate driving signal from the gate driving signal processing circuit 20 is input as is into the gate terminal of the second switch element 18.

Figure 2:
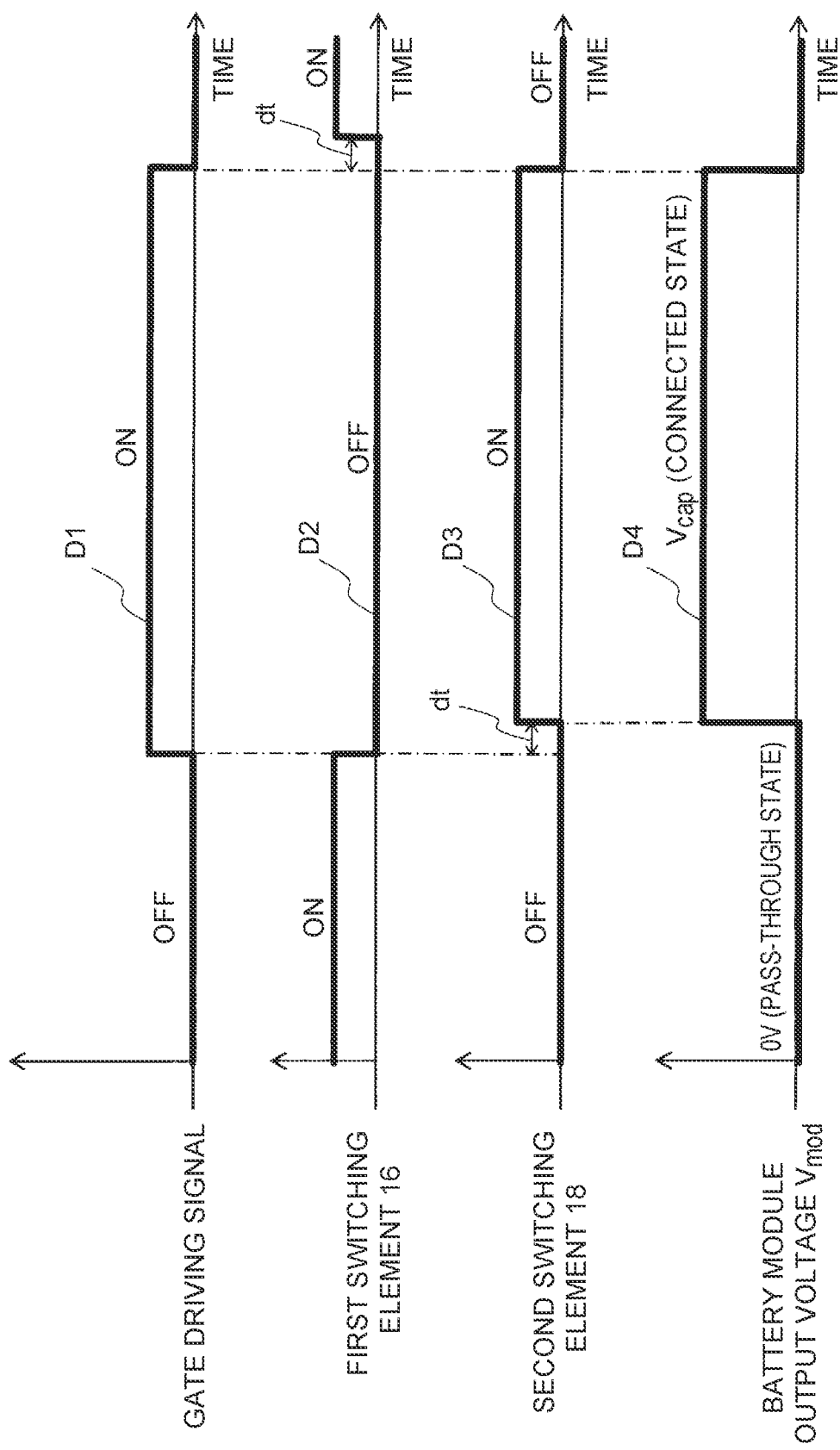
FIG. 2 is a diagram explaining a switching control using a gate driving signal according to the embodiment of the present disclosure.

FIG. 2 is a time chart relating to the operation of the battery module 102a. FIG. 2 shows a pulse waveform of a gate driving signal D1 that drives the battery module 102a, a rectangular wave D2 representing a switching state of the first switch element 16, a rectangular wave D3 representing a switching state of the second switch element 18, and a waveform D4 of a voltage V mod output from the battery module 102a.

In an initial state of the battery module 102a, i.e., in a state where the gate driving signal is not being output, the first switch element 16 is in an on state and the second switch element 18 is in an off state. When the gate driving signal is input from the controller 104 into the battery module 102a, switching of the battery module 102a is controlled by a PWM control. Under this switching control, the first switch element 16 and the second switch element 18 are switched so as to be alternately turned on and off.

As shown in FIG. 2, when the gate driving signal D1 is output from the controller 104, the first switch element 16 and the second switch element 18 of the battery module 102a are driven according to the gate driving signal D1. The first switch element 16 is switched from an on state to an off state as the signal from the NOT element 26 falls in response to a rise of the gate driving signal D1. The first switch element 16 is switched from an off state to an on state with a delay of a slight time (dead time dt) after a fall of the gate driving signal D1.

On the other hand, the second switch element 18 is switched from an off state to an on state with a delay of a slight time (dead time dt) after a rise of the gate driving signal D1. The second switch element 18 is switched from an on state to an off state at the same time that the gate driving signal D1 falls. Thus, switching of the first switch element 16 and the second switch element 18 is controlled such that these switch elements are alternately turned on and off.

Activation of the first switch element 16 with a delay of a slight time (dead time dt) after a fall of the gate driving signal D1, and activation of the second switch element 18 with a delay of a slight time (dead time dt) after a rise of the gate driving signal D1 are for the purpose of preventing the first switch element 16 and the second switch element 18 from being activated at the same time. Thus, short-circuit of the battery resulting from the first switch element 16 and the second switch element 18 turning on at the same time is prevented. The dead time dt that causes a delay in the activation is set to 100 ns, for example, but can be set to any appropriate time. During the dead time dt, a current is circulated through the diode, which creates the same state as when a switching element parallel to this diode through which a current circulates is turned on.

Figure 3A:
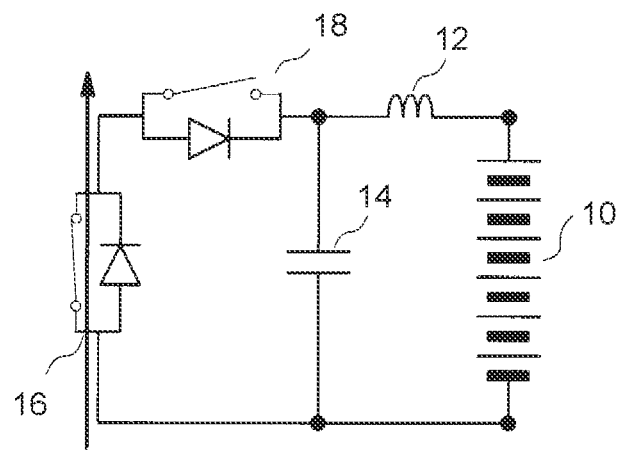
FIG. 3A is a diagram explaining the switching control using the gate driving signal according to the embodiment of the present disclosure.

In the battery module 102a thus controlled, as shown in FIG. 2, the capacitor 14 is isolated from the output terminal of the battery module 102a when the gate driving signal D1 is off (i.e., the first switch element 16 is on and the second switch element 18 is off). Therefore, no voltage is output from the battery module 102a to the output terminal. In this state, the battery module 102a is in a pass-through state in which the battery 10 (capacitor 14) thereof is bypassed as shown in FIG. 3A.

The capacitor 14 is connected to the output terminal of the battery module 102a when the gate driving signal is on (i.e., the first switch element 16 is off and the second switch element 18 is on). Thus, a voltage is output from the battery module 102a to the output terminal. In this state, the voltage V mod is output to the output terminal through the capacitor 14 of the battery module 102a, as shown in FIG. 3B.

Referring back to FIG. 1, control on the power supply device 100 by the controller 104 will be described. The controller 104 controls the whole power supply device 100. By controlling the respective operations of the battery modules 102a, 102b, 102c, . . . , the controller 104 controls the output voltage of the power supply device 100 as a whole.

The controller 104 outputs a rectangular-wave gate driving signal. The gate driving signal processing circuit 20 included in each of the battery modules 102a, 102b, 102c, . . . includes a delay circuit that delays the gate driving signal output from the controller 104 and sequentially outputs the signal. The gate driving signal processing circuit 20 outputs the gate driving signal with a delay of a certain time by the delay circuit to the adjacent battery module 102. As a result, the gate driving signal output from the controller 104 is sequentially delayed and transmitted to the battery modules 102a, 102b, 102c, . . . .

Figure 3B:
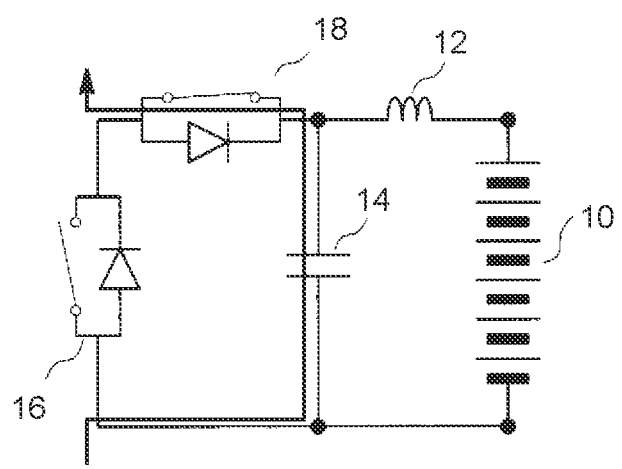
FIG. 3B is a diagram explaining the switching control using the gate driving signal according to the embodiment of the present disclosure.

In FIG. 1, when a gate driving signal is output from the controller 104 to the most upstream battery module 102a, this battery module 102a is driven, and a voltage in this battery module 102a is output to an output terminal OT as shown in FIGS. 3A, 3B. Further, after being delayed for a certain time by the gate driving signal processing circuit 20 of the battery module 102a, the gate driving signal is input into the adjacent battery module 102b. The battery module 102b is driven in the same manner as the battery module 102a by this gate driving signal. Further, the gate driving signal is further delayed for a certain time by the gate driving signal processing circuit 20 of the battery module 102b, and is then input into the adjacent battery module 102c. Hereinafter, in the same manner, the gate driving signal is delayed and input into the downstream battery modules, respectively. The battery modules 102a, 102b, 102c, . . . then are sequentially driven, and the voltages of the battery modules 102a, 102b, 102c, . . . are sequentially output to the respective output terminals OT.

Figure 4:
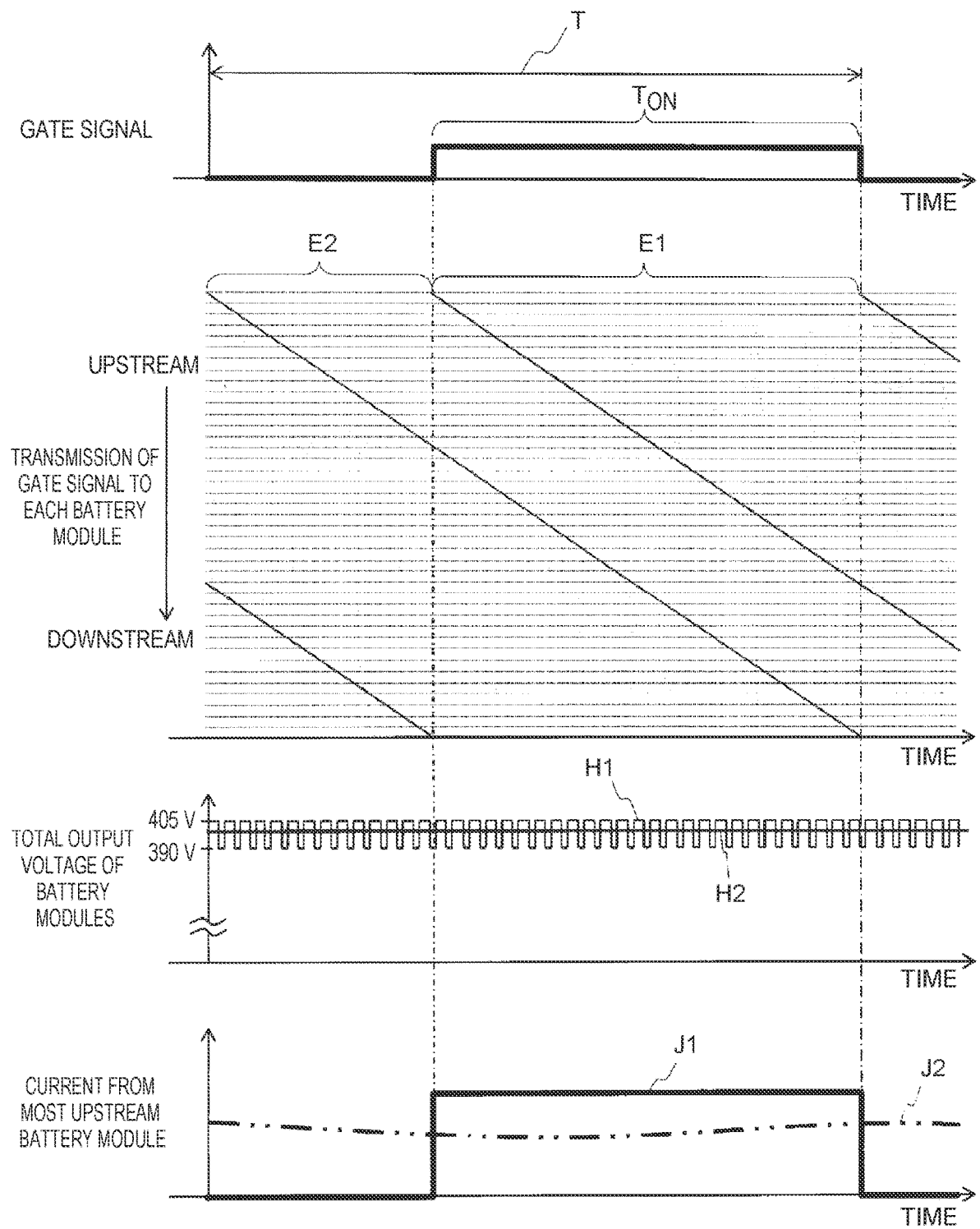
FIG. 4 is a diagram showing a control on the power supply device according to the embodiment of the present disclosure.

FIG. 4 shows a state in which the battery modules 102a, 102b, 102c, . . . are sequentially driven. As shown in FIG. 4, the battery modules 102a, 102b, 102c, . . . are driven according to the gate driving signal, one after another from an upstream side toward a downstream side, each with a delay of a certain time ($T_{delay}$).

In FIG. 4, a reference numeral E1 indicates a state in which the first switch elements 16 are off and the second switch elements 18 are on in the battery modules 102a, 102b, 102c . . . , and the battery modules 102a, 102b, 102c . . . output voltages from the output terminals OT (connected state). A reference numeral E2 indicates a state in which the first switch elements 16 are on and the second switch elements 18 are off in the battery modules 102a, 102b, 102c . . . , and the battery modules 102a, 102b, 102c . . . do not output voltages from the output terminals OT (pass-through state). In this manner, the battery modules 102a, 102b, 102c . . . are sequentially driven with a delay of a certain time ($T_{delay}$).

Next, setting of the gate driving signal and the delay time ($T_{delay}$) of the gate driving signal will be described. A cycle T of the gate driving signal is set by adding up delay times ($T_{delay}$) of the respective battery modules 102a, 102b, 102c . . . . For example, when N battery modules 102a, 102b, 102c, . . . 102n operate with the same delay time ($T_{delay}$), the cycle T of the gate driving signal is represented by $T=N \times T_{delay}$. Therefore, setting a longer delay time ($T_{delay}$) results in a lower frequency of the gate driving signal. Conversely, setting a shorter delay time ($T_{delay}$) results in a higher frequency of the gate driving signal. The delay time ($T_{delay}$) by which the gate driving signal is delayed can be appropriately set according to the required specifications of the power supply device 100.

An on-time ratio (on-duty) D during the cycle T of the gate driving signal, that is, a ratio of an on period $T_{ON}$ during the cycle T can be calculated by (output voltage of the power supply device 100)/(total voltage of all the battery modules 102a, 102b, 102c, . . . ). The total voltage of all the battery modules 102a, 102b, 102c, . . . can be calculated by battery voltage of the battery module×the number of battery modules. Thus, the on-time ratio D=the output voltage of the power supply device/(the battery voltage of the battery module×the total number of the battery modules). To be exact, the on-time ratio deviates by the dead time dt; therefore, the on-time ratio is corrected by feed-back or feed-forward, as commonly practiced for chopper circuits.

As described above, the output voltage $V_{out}$ of the power supply device 100 can be represented by (an average voltage $V_{mean}$ of) the battery voltages of the battery modules×the number of battery modules in a connected state ($N_{ON}$). At this time, the on period $T_{ON}$ is represented by $T_{ON}=V_{out} \times T_{delay}/V_{mean}$, using the output voltage $V_{out}$ of the power supply device 100, the average voltage $V_{mean}$ of the battery module battery voltage, and the delay time $T_{delay}$.

Sequential driving of the battery modules 102a, 102b, 102c, . . . yields output characteristics of rectangular waves indicated by a reference numeral H1 in FIG. 4. That is, the voltage varies in a cycle calculated by the cycle T of the gate driving signal/the number of battery modules. This variation is filtered by parasitic inductance due to the wiring of the battery modules 102a, 102b, 102c, . . . , and thus the power supply device 100 as a whole outputs a more stable voltage $V_{out}$ as indicated by a reference numeral H2.

As has been described above, in the driving of the power supply device 100, the gate driving signal output to the most upstream battery module 102a is then output to the downstream battery module 102b with a delay of a certain time, and this gate driving signal is further sequentially transmitted to the downstream battery modules, each with a delay of a certain time, so that the battery modules 102a, 102b, 102c, . . . sequentially output a voltage, each with a delay of a certain time. These voltages are added up to a voltage that is output from the power supply device 100 as a whole, to thereby obtain a desired voltage.

In addition, by adjusting the on-time ratio D, it is possible to easily cope with a desired voltage, to thus improve versatility as the power supply device 100. In particular, even when some of the battery modules 102a, 102b, 102c, . . . become difficult to be used because of a failure, these defective battery modules can be removed, and the normal battery modules can be used to obtain a desired voltage. That is, a desired voltage can be continuously output even when a failure occurs in some of the battery modules 102a, 102b, 102c . . . .

Further, as the delay time by which the gate driving signal is delayed is set longer, the frequency of the gate driving signal becomes lower, and so does the switching frequency of the first switch element 16 and the second switch element 18, which results in a smaller switching loss and higher power conversion efficiency. Conversely, when the delay time by which the gate driving signal is delayed is set shorter, the frequency of the gate driving signal becomes higher, and so does the frequency of the voltage variation, which facilitates filtering of the variation, to thus obtain a stable voltage. It also becomes easier to smooth out a current variation by the RLC filter. Thus, it is possible to provide the power supply device 100 according to the required specifications and performance by adjusting the delay time by which the gate driving signal is delayed.

In the above description, although it has been shown that a desired voltage can be output by controlling the number of battery modules 102 to be used, it is also possible to control the output current by controlling the voltage. In the case in which the power supply device 100 is connected to a DC bus having a constant voltage, a measured value of a current sensor disposed at the output end is used as a specified current value so as to calculate the on time ($T_{ON}$) by feedback control such as PI control, and whereby the output current of the power supply device 100 can be made to follow a desired command current.

Forced Disconnection Processing of Battery Module

Next, description will be provided on a forced disconnection processing on the battery module 102 in the case where a failure occurs in some of the battery modules 102 included in the power supply device 100 and it is desired to put them in a normally disconnected state (pass-through state). In the present embodiment, a pass-through command for a desired battery module 102 is superimposed on the gate driving signal and is transmitted so as to execute the forced disconnection processing on this battery module 102.

Figure 5:
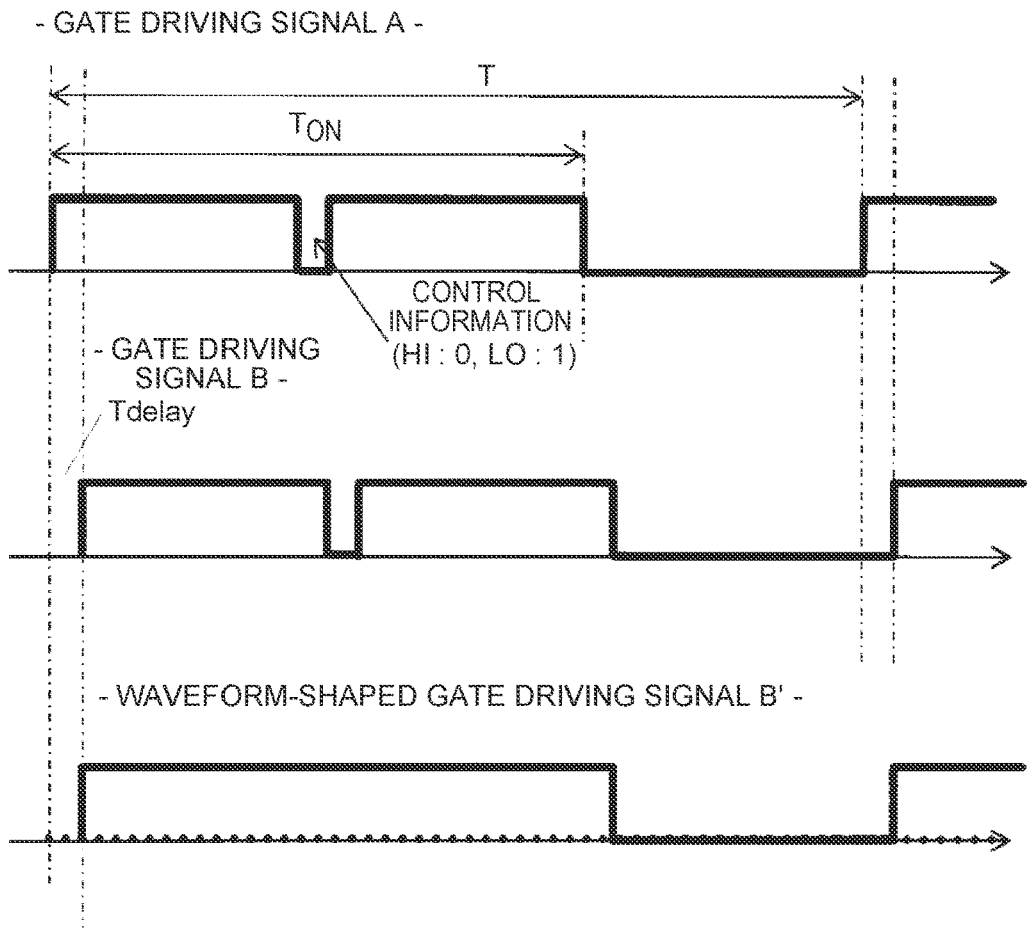
FIG. 5 is a diagram explaining a method of superimposing a control signal on the gate driving signal according to the embodiment of the present disclosure.

FIG. 5 shows an example of a method of superimposing control information for the battery module 102 concerned on the gate driving signal from the controller 104. The controller 104 generates a gate driving signal on which a control signal for the battery module 102 concerned is superimposed, depending on whether or not a short-time off state is added at one position in the on period of the gate driving signal.

In the battery module 102, when receiving the gate driving signal on which the control signal is superimposed in this manner, the gate driving signal processing circuit 20 determines presence of an off period for a predetermined time in the middle of the on period is determined as "1", and determines absence of this off period as "0". In this manner, 1-bit information transmission is feasible by one switching cycle. After performing the delay processing with a predetermined delay time $T_{delay}$ on the gate driving signal, the gate driving signal processing circuit 20 then performs waveform shaping of the signal, and generates a waveform-shaped gate driving signal from which the off period that is the control signal is removed. Then, switching of the first switch element 16 and the second switch element 18 is controlled based on this waveform-shaped gate driving signal.

FIG. 5 illustrates a gate driving signal A for the battery module 102*a*, a gate driving signal B for the battery module 102*b*, and a waveform-shaped gate driving signal B'. After performing the delay processing for the predetermined delay time $T_{delay}$ on the gate driving signal, the battery module 102*a* transfers the signal to the battery module 102*b*. The battery module 102*a* performs waveform shaping of the gate driving signal, generates a waveform-shaped gate driving signal from which the off period as the control signal is removed (not shown), and controls switching of the first switch element 16 and the second switch element 18 by this generated waveform-shaped gate driving signal. The battery module 102*a* performs the waveform shaping of the gate driving signal so as to maintain the on period $T_{ON}$ regardless of the superimposition of the control signal. After performing the delay processing for the predetermined delay time $T_{delay}$ on the gate driving signal received from the battery module 102*a*, the battery module 102*b* transfers this signal to the battery module 102*c*. Further, the battery module 102*b* performs the waveform shaping of the gate driving signal, generates the waveform-shaped gate driving signal from which the off period as the control signal is removed (waveform-shaped gate driving signal B'), and controls the switching of the first switch element 16 and the second switch element 18 by this waveform-shaped gate driving signal. The above processing is repeated from the battery module 102 on the upstream to the battery module 102 on the downstream included in the power supply device 100.

Figure 6:
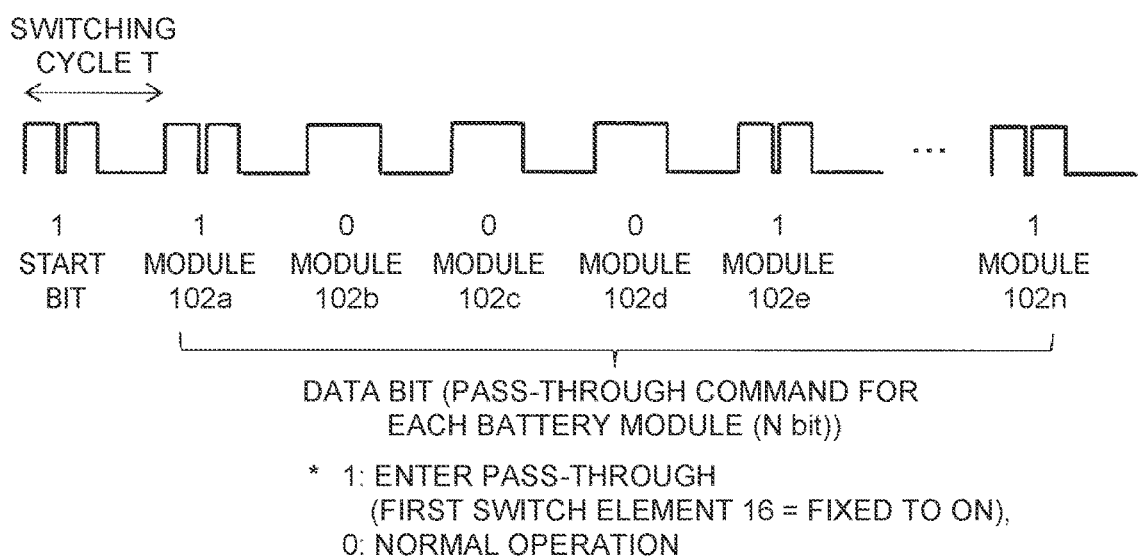
FIG. 6 is a diagram showing a forced disconnection processing using the gate driving signal according to the embodiment of the present disclosure.

FIG. 6 is a diagram explaining a processing of determining the battery module 102 to be forcibly disconnected using the control signal. First, as a start bit for informing a start of data communication, information indicating 1 (an off state) is superimposed in the on period of the gate driving signal during the first switching cycle T. When N battery modules 102 are included in the power supply device 100, subsequent N cycles are set as data transmission periods. Then, after sending the gate driving signal including the start bit, a forced disconnection command is transmitted to each battery module depending on presence or absence of a short-time off state in the on period during each switching cycle T. That is, in order to put the x-th battery module 102*x* into the forced disconnection state, after the start bit is sent, the control signal is superimposed on the gate driving signal during the x-th switching cycle T, and then sent.

The gate driving signal processing circuit 20 of each battery module 102 receives the gate driving signal on which the start bit is superimposed, and thereafter this gate driving signal processing circuit 20 counts the number of reception times of the gate driving signal during the N-th switching cycle T. Based on the number of reception times of the gate driving signal on which the control signal for the forced disconnection command is superimposed, when the number of counts corresponds to its own battery module 102, the gate driving signal processing circuit 20 controls the AND element 22 and the OR element 24 to enter a forced disconnection state (pass-through state). On the other hand, when the number of counts does not correspond to its own battery module 102, the gate driving signal processing circuit 20 does not enter the forced disconnection state (pass-through state). For example, when a gate driving signal for N battery modules is sent as shown in FIG. 6, the battery modules 102*a*, 102*e*, . . . 102*n* are controlled to enter the forced disconnection state (pass-through state), and the battery modules 102*b*, 102*c*, 102*d*, . . . are controlled to enter the normal state.

At this time, the gate driving signal from the battery module 102 in the forced disconnection state is transmitted, not via the delay circuit and with no delay, to the subsequent battery module 102. Therefore, the switching cycle T is expressed as a switching cycle $T=T_{delay}\times(N-N_{pass})$, where the number of the modules in the subsequent battery module 102 in the forced disconnection state (pass-through state) is $N_{pass}$.

Battery Module Forced Connection Processing

In place of the control signal for the forced disconnection, or in addition to the control signal for the forced disconnection, the length of the data bit is increased to make the other control information have the same length, and communication with each battery module 102 can be made using this information.

For example, an N [bit] for the forced connection command may be transmitted following an N [bit] for the forced disconnection command. After receiving the gate driving signal on which the control signal corresponding to the start bit is superimposed, the gate driving signal processing circuit 20 in each battery module 102 counts the number of times the gate driving signal is received. Then, based on the number of counts, the gate driving signal processing circuit 20 in the x-th battery module 102 detects presence or absence of a short-time off state in the on period during the (N+x)-th switching cycle T. If detecting the off state, the gate driving signal processing circuit 20 determines that the control signal of the forced connection command for the battery module 102 concerned is superimposed on the gate driving signal, and then the gate driving signal processing circuit 20 performs the forced connection control. Specifically, the gate driving signal processing circuit 20 controls the AND element 22 and the OR element 24 to enter a forced connection state. Further, the gate driving signal processing circuit 20 does not enter the forced connection state if receiving no control signal for setting its own battery module 102 in the forced connection state.

At this time, the gate driving signal transmitted from the battery module 102 in the forced connection state is transmitted not via the delay circuit and without being delayed to the next battery module 102. Hence, the switching cycle T is represented by the switching cycle $T=T_{delay}\times$ ($N-N_{pass}-N_{fon}$), where $N_{fon}$ is the number of the subsequent battery modules 102 in the forced connection state.

Modification

Figure 7:
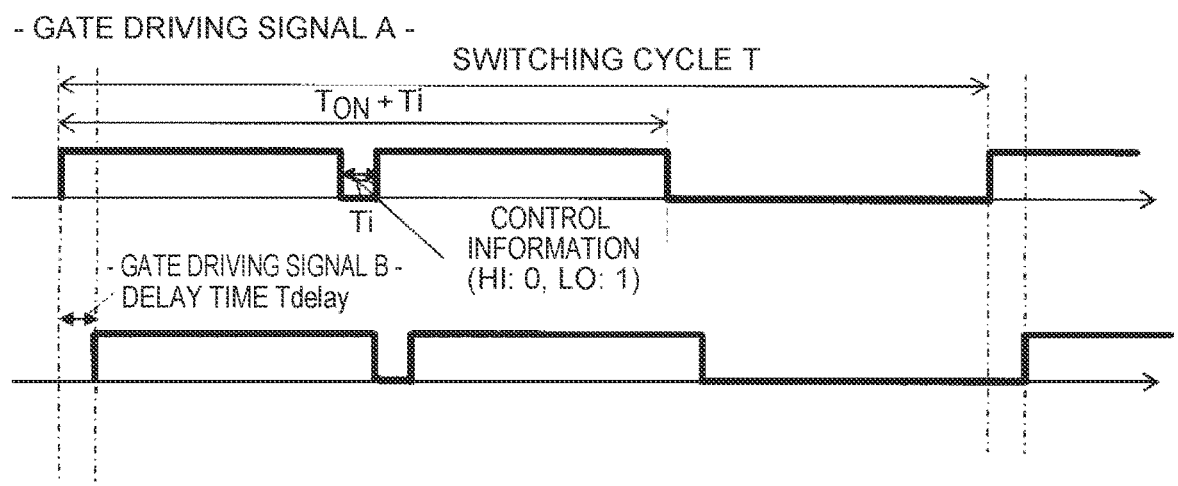
FIG. 7 is a diagram explaining another example of the method of superimposing the control signal on the gate driving signal according to the embodiment of the present disclosure.

FIG. 7 shows another example of the method of superimposing the control information on the gate driving signal output by the controller 104.

In this modification, the gate driving signal is generated such that an off state at a time $T_1$ is added on the gate driving signal while an on period $T_{ON}$ during the switching cycle T is maintained. By generating such a gate driving signal, it is possible to eliminate necessity of performing the waveform shaping on the gate driving signal in the gate driving signal processing circuit 20.

Battery Module State Transmission Processing

It is also possible to transmit the gate driving signal on which the state signal indicating the state of each battery module 102 is superimposed. Specifically, in the power supply device 100, since the gate driving signal is returned to the controller 104 through the respective battery modules 102, it is possible to output the state information of each battery module 102 by superimposing the state signal indicating the state of the module on the gate driving signal in the gate driving signal processing circuit 20 of each battery module 102.

As for the state signal, in place of the control signal for the forced disconnection or the control signal for the forced connection, or in addition to these control signals by increasing the length of the data bits, it is also possible to provide communication from each battery module 102 to the controller 104.

Figure 8:
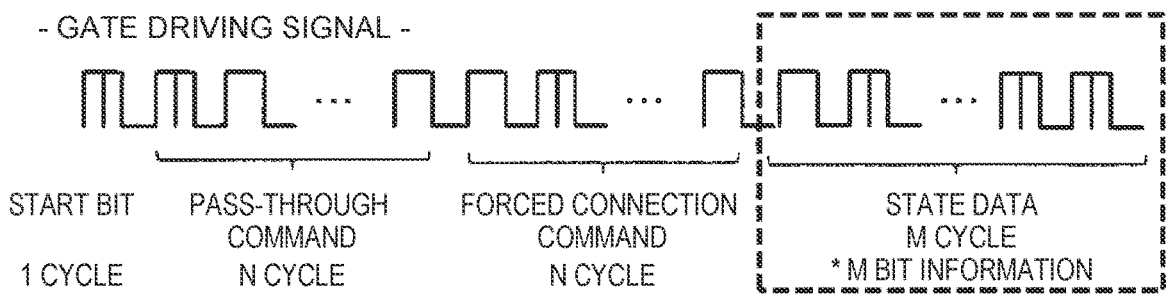
FIG. 8 is a diagram explaining the method of superimposing a state signal on the gate driving signal according to the embodiment of the present disclosure.

FIG. 8 shows, in addition to the control signals for forced disconnection and forced connection, a sequence of communication using the state signal indicating the state of the battery module 102 concerned. After sending a first gate driving signal on which the start bit is superimposed, the controller 104 sends a control signal for the forced disconnection using a gate driving signal for N (N cycles of) battery modules 102, and subsequently sends a control signal for the forced connection using a gate driving signal for the N (N cycles of) battery modules. Thereafter, the controller 104 transmits M-bit state information to the gate driving signal for M cycles. That is, the gate driving signal processing circuit 20 of each battery module 102 superimposes 1-bit of information on each gate driving signal, and then transmits the signal. Specifically, the gate driving signal processing circuit 20 can transmit information indicating "1" by superimposing an off period on the on period $T_{ON}$ of the gate driving signal, and indicating "0" by superimposing no off period thereon.

For example, after the start bit is received, the control information from the controller 104 is not added to the on period $T_{ON}$ of the gate driving signal of the (2N+1)-th cycle; therefore, the state information of the first battery module 102a is superimposed on this gate driving signal, and is then transmitted to the controller 104. By using the gate driving signal for the (2N+1) to (2N+16) cycles, a 16-bit state signal for the first battery module 102a can be transmitted. The controller 104 can detect whether or not short off periods are superimposed on the on periods $T_{ON}$ for the (2N+1) to (2N+16) cycles of the gate driving signal returned from the last battery module 102n, and pick up the state information. In each battery module 102, the switching of the first switch element 16 and the second switch element 18 is controlled by using the waveform-shaped gate driving signal whose waveform is shaped by removing the state signal superimposed on the gate driving signal.

The state quantity of each of the battery modules 102b to 102n can also be transmitted by using a gate driving signal for the subsequent cycle.

Here, the state information on the battery module 102 of interest can be configured as information regarding the voltage, temperature, SOC, etc., of this battery module 102, for example. However, the present disclosure is not limited to them.

As described above, in the power supply device 100 of the present embodiment, bidirectional communication can be performed between the controller 104 and each battery module 102 by using the gate driving signal.

What is claimed is:

1. A power supply device including a plurality of battery modules having secondary batteries, the battery modules being connected to one another in series according to a gate driving signal from a controller, the power supply device delaying the gate driving signal in a gate driving signal processing circuit included in each of the battery modules by a predetermined delay time, and thereafter, transmitting the gate driving signal from an upstream to a downstream of the series connection, the power supply device controlling the battery modules by superimposing a control signal for at least one of the battery modules on the gate driving signal;

wherein the gate driving signal processing circuit removes the control signal from the gate driving signal on which the control signal for the at least one battery module is superimposed so as to generate a waveform-shaped gate driving signal with a shaped waveform, and controls the at least one battery module by using the control signal and the waveform-shaped gate driving signal, and transmits the gate driving signal on which the control signal is superimposed to the battery module located downstream;

wherein:

at least one of the battery modules includes a disconnecting unit that forcibly disconnects the at least one battery module from the series connection regardless of the state of the gate driving signal; and the control signal is a signal for forcibly disconnecting the at least one battery module from the series connection by the disconnecting unit; and wherein the gate driving signal processing circuit of each battery module receives a gate driving signal on which a start bit is superimposed, and thereafter the gate driving signal processing circuit counts the number of reception times of the gate driving signal during an N-th switching cycle T;

wherein the gate driving signal processing circuit controls an AND element and an OR element to enter a forced disconnection state based on the number of reception times of the gate driving signal on which the control signal for the forced disconnection state is superimposed when the number of counts corresponds to its own battery module; and wherein when the number of counts does not correspond to its own battery module, the gate driving signal processing circuit does not enter the forced disconnection state.

* * * * *